United States Patent Office 3,315,293
Patented Apr. 25, 1967

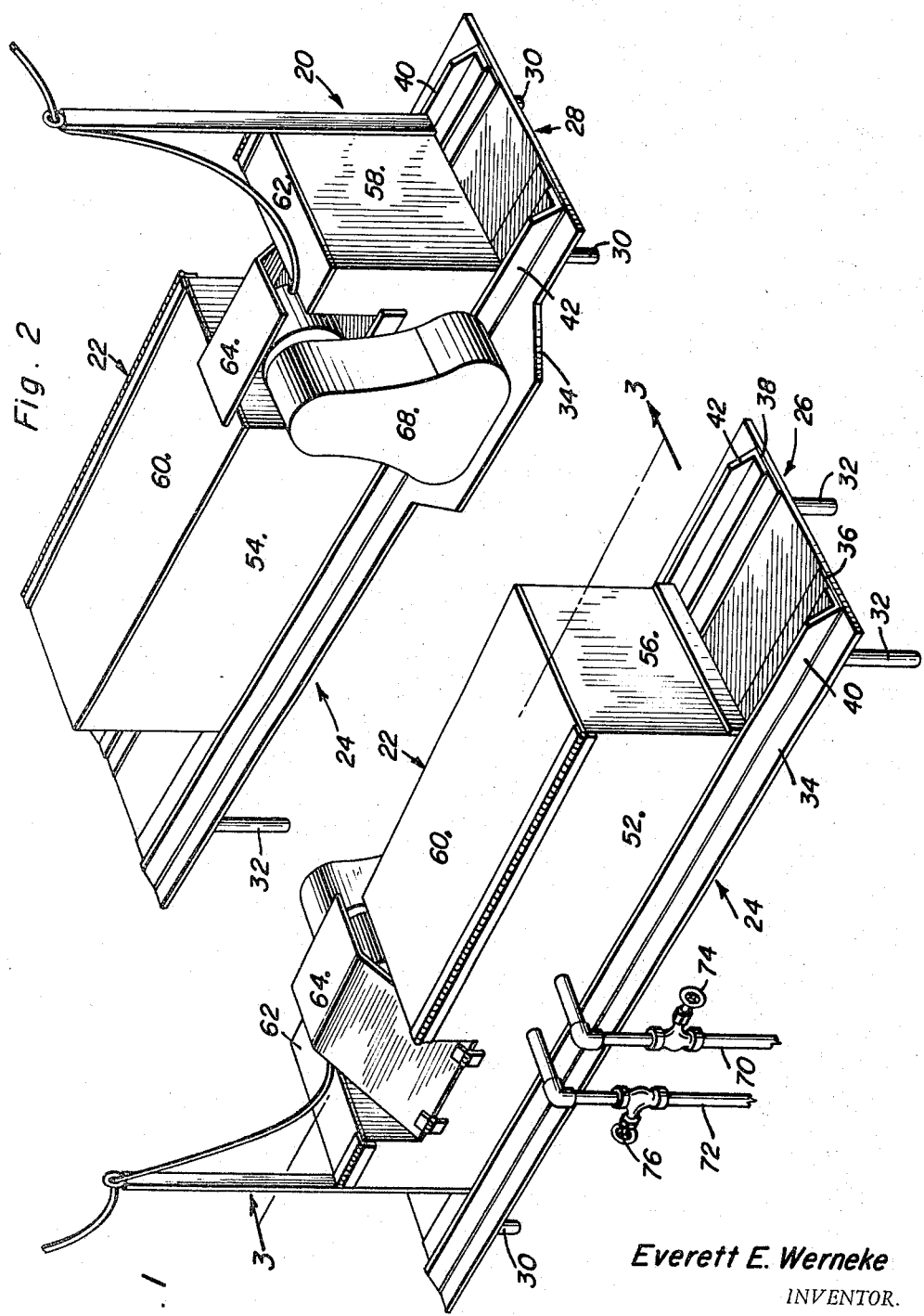

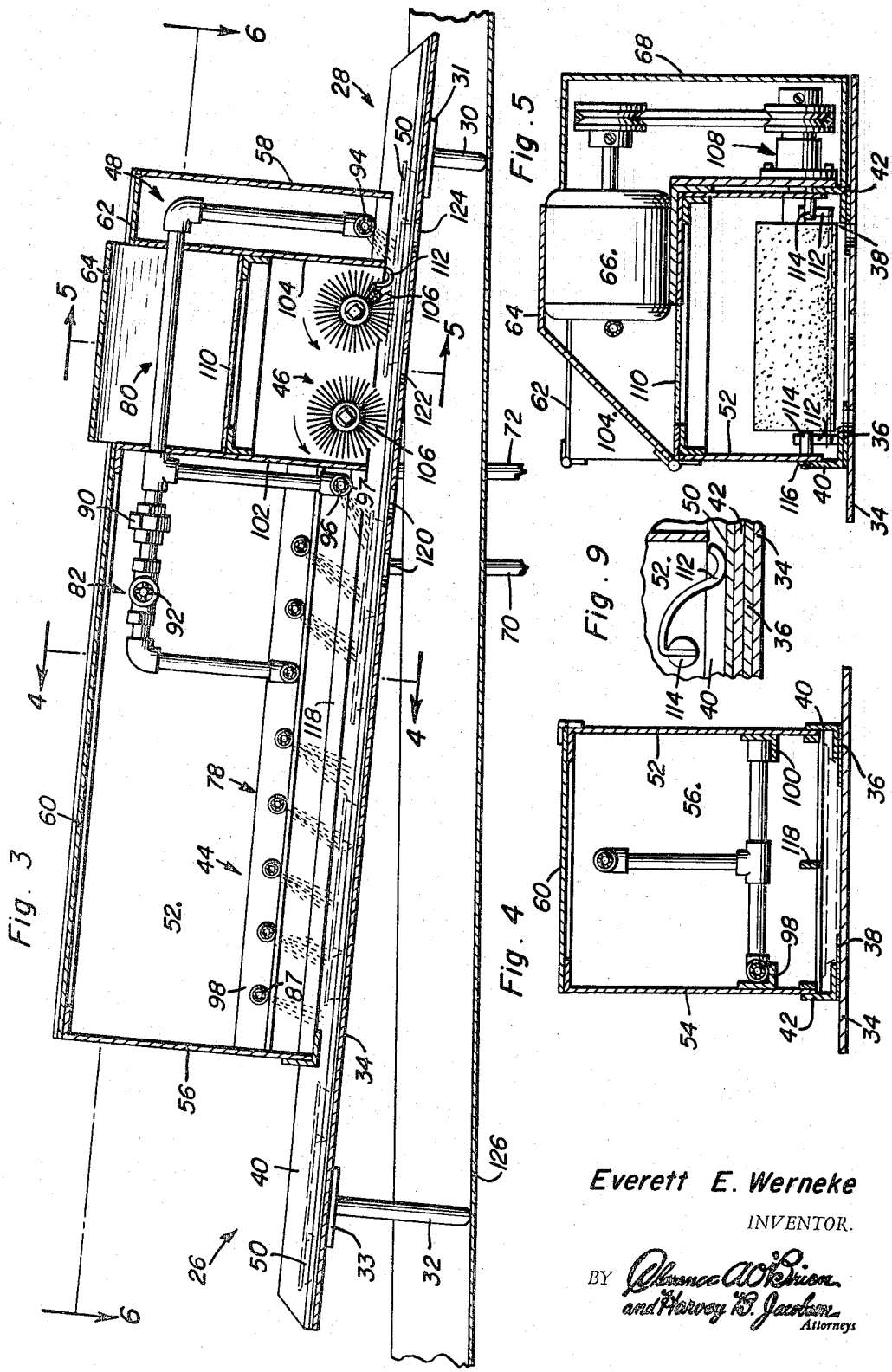

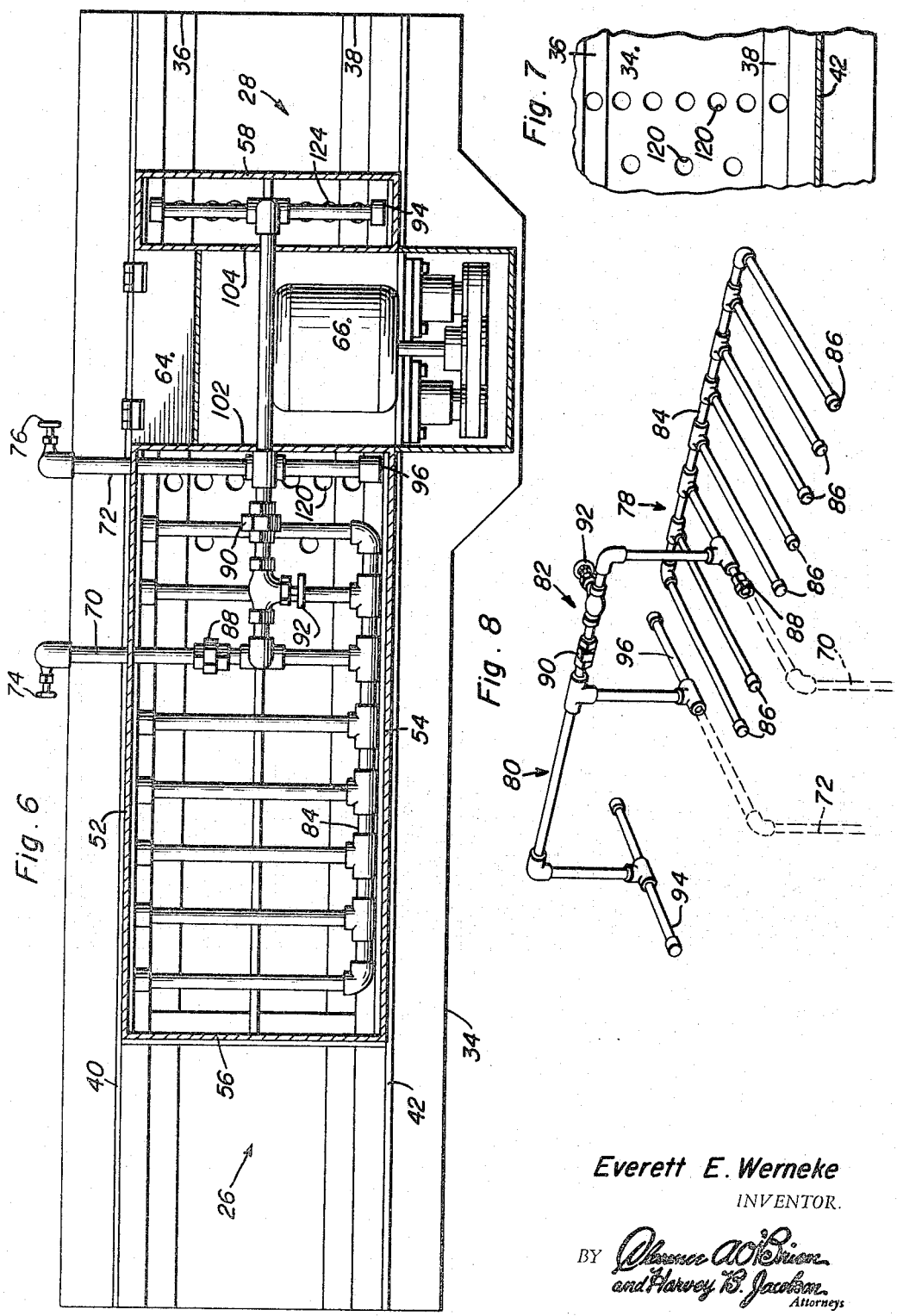

3,315,293
UTENSIL PREWASHING MACHINE
Everett E. Werneke, Box 14, Chilocco, Okla. 74635
Filed Feb. 26, 1965, Ser. No. 435,414
8 Claims. (Cl. 15—56)

This invention relates generally to new and useful improvements in utensil washing machinery and more particularly to a relatively simple compact machine for prewashing eating utensils, such as trays and dishes, prior to placing them into dishwashing or sterilizing equipment.

In the handling of food service utensils it is highly desirable, if not imperative, that the major portion of the foreign matter, or leftover foods, which adheres to the utensil must be removed prior to attempting to wash the utensil with a detergent solution or sterilize the utensil. This is of utmost importance because unless the utensil is substantially cleaned of foreign material prior to washing, the ordinary dishwashing equipment generally utilized in restaurants and institutions will not remove heavy or tenaciously adhering accumulations which then may serve as a protective encrustation for pathogenic bacteria and thereby give rise to the spread of communicable diseases. The utensils are generally, therefore brushed or scraped to remove the major portion of the foreign material adhering thereto. When this task is performed manually it is difficult if not impossible to expect the person performing the task to also subject the utensils to a spray or a bath of water which is of sufficient temperature to insure proper presoaking and emulsifying of a substantial portion of the foreign material adhering to the utensils.

Attempts have been made to provide prewash machines to effectively soak and remove a substantial portion of the foreign material adhering to food service utensils; however, they have not been entirely successful.

A need therefore exists for a compact, relatively inexpensive utensil prewashing machine which may be used as an adjunct to a conventional dishwashing machine and sterilizer to efficiently soak, emulsify, and remove substantially all of the foreign material adhering to the utensils thereby greatly facilitating the thorough sanitizing of the utensils for reuse.

It is therefore a primary object of this invention to provide a utensil prewashing machine which will efficiently remove substantially all of the foreign material adhering to the utensil.

It is another object of the invention to provide a utensil prewashing machine which is of compact design to enable its convenient placement in the normal flow line of utensils being loaded into a conventional dishwasher.

It is a further object of this invention to provide a utensil prewashing machine which is relatively simple in design, and requires a minimum of moving parts, in order to keep maintenance problems to an absolute minimum.

It is a further object of this invention to provide a simple but efficient utensil prewashing machine which permits ready access to all the interior portions thereof to facilitate cleaning of the machine.

Still another object of this invention is to provide a utensil prewashing machine with dual temperature treatment zones which greatly facilitates the prewashing of food service utensils by permitting the selection of appropriate treatment temperatures in accordance with the particular type of foreign material being encountered at any given time, such as might be occasioned by the different types of food encountered during a breakfast meal as opposed to those types of food encountered during an evening time meal.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front perspective view of the utensil prewashing machine embodying the present invention, as viewed from the utensil inlet end;

FIGURE 2 is a rear perspective view of the device of FIGURE 1, showing the utensil outlet end;

FIGURE 3 is a slightly enlarged vertical sectional view of the present utensil prewashing machine taken substantially along the plane of the line 3—3 of FIGURE 1 further illustrating in broken lines the passage of a plurality of utensils through the machine on the downwardly slanting gravity-feed conveyor;

FIGURE 4 is a vertical cross-sectional view taken substantially along the plane of the line 4—4 of FIGURE 3;

FIGURE 5 is a vertical sectional view taken substantially along the plane of the line 5—5 of FIGURE 3;

FIGURE 6 is a top horizontal sectional view taken substantially along the plane of the line 6—6 of FIGURE 3 showing the orientation of the hot and cold water spray headers;

FIGURE 7 is a fragmentary top plan view of a portion of downwardly slanting gravity-feed conveyor of the present device showing a plurality of drain holes therein;

FIGURE 8 is a perspective view of the hot and cold water spray headers as they are operatively associated when in position within the utensil prewashing machine; and FIGURE 9 is a slightly enlarged plan view of a portion of the utensil prewashing machine, further showing one of the resilient utensil hold-downs.

Referring now to the drawings, and to FIGURES 1 and 2 in particular a utensil prewashing machine is indicated generally as at 20. The utensil prewashing machine 20 includes a prewash tunnel indicated generally at 22 and a downwardly inclined gravity-feed conveyor indicated generally at 24. The utensil inlet end of the utensil prewashing machine 20 is indicated generally at 26 and the prewashed utensil outlet end is indicated generally at 28. A pair of relatively short legs 30 is provided at the outlet end 28 of the utensil prewashing machine 20. The relatively short legs 30 are secured by means of welding, for example to their respective mounting plates 31 which are in turn secured by suitable means adjacent the lower end of the downwardly inclined gravity-feed conveyor 24. A pair of relatively longer legs 32 is provided adjacent the soiled utensil inlet end 26. The relatively longer legs 32 are secured by suitable means, such as welding to their respective mounting plates 33 which are in turn secured by suitable means adjacent the inlet end 26 of the downwardly inclined gravity-feed conveyor 24. As will come subsequently clear, this arrangement of relatively longer legs 32 and relatively shorter legs 30 imparts a sufficient inclination to the gravity-feed conveyor 24 to enable the utensil prewashing machine 20 to operate efficiently without the necessity of incorporating a relatively complex power operated conveyor to transport the soiled utensils through the prewash tunnel 22. Other advantages are also derived from the downwardly inclined orientation of the gravity-feed conveyor 24 and such advantages will be discussed in detail subsequently.

The downwardly inclined gravity-feed conveyor 24 includes a substantially flat base plate, or floor 34. The base plate 34 is preferably formed of an aluminum alloy, or other suitable relatively non-corrosive metal. Since the use of aluminum for the base plate 34 is preferred because of its lightness and relatively economical cost, a means is provided for utensils passing through a prewash tunnel 22 to slide upon because of the abrasive nature of aluminum. Accordingly, there is provided a pair of slide members 36 and 38 which are preferably formed of a non-abrasive, or relatively non-galling metal such as stainless steel, for example. The slide members 36 and 38 are secured to the base plate 34 by virtue of the fact that they are sandwiched between the base plate 34 and a pair of outer guide rail-tunnel mounting angles 40 and 42 which extend substantially the entire length of the base plate 34. The rails or angles 40 and 42 are secured to the base plate 34 by means of rivets, bolts, or the like which also pass through the slide members 36 and 38. The angles or rails 40 and 42 are preferably formed of extruded aluminum, or the like.

The prewash tunnel 22 is supported at a suitable distance above the base plate 34 by the angle members 40 and 42 to allow passage of the utensils thereunder. The prewash tunnel 22 is of a generally downwardly opening elongated rectangular box shape and includes a region indicated generally at 44 for initially rinsing and soaking the utensils passing through the tunnel 22 and a brushing region indicated generally at 46, and a final rinse region indicated generally at 48.

As seen best in FIGURE 3, the utilization of this device briefly involves passing a plurality of utensils 50 along the downwardly inclined gravity-feed conveyor 24 into the prewash tunnel 22 where they are, as will be described in detail later, subjected to the three various regions of treatment namely the initial rinsing and soaking region 44, the mechanical brushing region 46, and the final rinsing and cooling region 48, and thence out the outlet end 28 of the prewashing machine 20.

Referring again to FIGURES 1 to 2, it may be seen that the prewash tunnel 22 includes side walls 52 and 54, end walls 56 and 58 and hingedly secured top sections 60 and 62. The prewash tunnel 22 further includes a cover and guard means for the mechanical brushes which includes a hingedly secured cover 64 for the electric motor 66 and the drive pulley guard 68 which is removably secured by suitable means (not shown).

As seen best in FIGURES 3, 6 and 8, the prewash tunnel 22 is connected to a suitable hot water line 70 and cold water line 72 which are under suitable line pressure. The hot water line 70 is provided with a suitable metering and shut-off valve 74 and the cold water supply line 72 is provided with a suitable metering and shut-off valve 76. The hot water supply line 70 is connected to a hot water spray header indicated generally at 78 and the cold water supply line 72 is connected to a cold water spray header indicated generally at 80. The hot water spray header 78 and the cold water spray header 80 are connected by by-pass means indicated generally at 82. The hot water spray header 78 includes a main header 84 which is connected to the hot water supply line 70 with suitable pipe fittings, such as is best seen in FIGURES 6 and 8, and includes suitable pipe fittings which are threadably connected, such as straight nipples, T's, elbows, and pipe caps. The spray arms 86 are formed of suitable lengths of pipe which are provided with a plurality of spray orifices 87 as seen best in FIGURE 3. The hot water spray header 78 is also provided with a pipe union 88 to facilitate its ready removal from the prewash tunnel 22 to facilitate cleaning the header. As seen best in FIGURE 8 a T is provided on the discharge side of the pipe union 88 to provide a by-pass means 82 to connect to the cold water spray header 80. The by-pass means 82 includes a pipe union 90 and a by-pass metering and shut-off valve 92 which is preferably of a globe or needle type which permits accurate metering of the water passing therethrough; for reason which will become clear. It will be understood that by disengaging the pipe unions 88 and 90 it is possible to completely remove the hot water spray header 78 and its integral portion of the by-pass means 82 through the hingedly secured top portion 60 of the prewash tunnel 22 in order to facilitate cleaning thereof, due to the fact that food particles may be cooked onto the hot water header by virtue of relatively high operating temperature which generally is at or above the cooking point of proteinaceous matter which is present on the soiled utensil passing through the prewash tunnel 22.

The cold water spray header 80 is connected by suitable pipe fittings to the cold water supply 72 and includes a pair of transverse spray arms 94 and 96 which are provided with a plurality of spray orifices 97, which have a smaller total cross-sectional area than the spray orifices 87 in the spray arm 86 for reasons which will become clear. Since there is very little likelihood of stubborn accumulations of food particles building upon the cold water spray header 80 it is not necessary that it be readily removable from the prewash tunnel 22 as is the hot water spray header 78. Although the spray headers 78 and 80 and the by-pass 82 have been illustrated as being made up of threadably joined pipe fittings it will be understood that the spray headers may be fabricated by welding, or brazing together suitable lengths of pipe to form integral units which are provided with the proper valve and union and spray orifices as previously described.

As seen best in FIGURES 3 and 6 the hot water spray header 78, the by-pass means 82, and one portion of the cold water spray header 80, namely the spray arm 96, are operatively positioned within the initial rinsing-soaking region 44 of the prewash tunnel 22 by means of the angular rail members 98 and 100 which are secured to the respective sides 52 and 54 of the prewash tunnel 22 by suitable means such as welding, riveting or the like.

The soaking region 44 is divided from the brushing region 46 by a baffle wall 102 which extends substantially the full height of the prewash tunnel 22 as seen best in FIGURES 3 and 6. The baffle wall 102 is provided with a suitable aperture for the through passage of the upper portion of the cold water header 80. The brushing region 46 is separated from the final rinse region 48 by a baffle plate 104 which also extends substantially the full height of the prewash tunnel 22. The baffle plate 104 is provided with a suitable aperture adjacent its upper end for the through passage of the upper portion of the cold water header 80.

The brushing region 46 is provided with a pair of power operated rotary brushes 106 which rotate in the direction of the arcuate arrows shown adjacent the brushes in FIGURE 3. The brushes are cantilevered and are rotatably journaled in the brush bearing and drive pulley means indicated generally at 108 and are powered by the electric motor 66 and its associated drive pulley and belt. The rotary brushes 106 and their associated bearings and the electric motor 66 are removably secured to the prewash tunnel 22 so that they may be removed as an integral unit in the event that replacement of the brushes or repairs to the drive train must be effected. The top of the brush region 46 is provided with a transparent member 110 which may be formed of Plexiglas, or the like so that the condition and operation of the rotary brushes 106 may be observed by merely raising the guard 64. As seen best in FIGURES 3 and 9, the brushing region 46 is further provided with a plurality of adjustably secured frictional means 112 which frictionally engage the utensils 52 being operated upon by the rotary brushes 106 to prevent the utensil 50 from being discharged too rapidly by virtue of the forces imparted to it by the rotary brushes 106, thereby also insuring that the rotary brushes 106 will be in contact with the utensil 50 for a time sufficient to completely dislodge any foreign material which may be adhering to the utensil 50. The frictional utensil engaging and restraining means 112 may be adjustably biased against the utensils 50 passing thereunder by selectively rotating their associated mounting pins 114 and securing the mounting pins 114 by the threadably received locking nuts 116 as seen best in FIGURE 5.

The power rotary brushes 106 are preferably made of nylon or other relatively insert non-absorbent material to preclude their deterioration, thus making cleaning of the brushes relatively simple.

As seen best in FIGURES 3 and 4 the initial rinsing and soaking region 44 of the prewash tunnel 22 is provided with a longitudinal utensil hold-down bar 118 which does not normally contact the utensils 50 passing thereunder but is provided to prevent any bent or distorted utensils 50 from jamming against the spray headers 87 or the baffle plate 102.

As seen best in FIGURE 3 and FIGURE 6 the water spraying out of the spray orifices 87 of the spray arms 86 sprays out at an angle which is slightly toward the inlet 26 of the prewash tunnel 22. This will tend to puddle up the water in the utensil 50 that is passing beneath to give both a soaking action and a floating action to float away the foreign matter which is only adhered loosely and foreign matter which is emulsified by the action of the hot water spraying out of the spray arms 86. The cold spray arms 94 and 96 and the associated spray orifices 97 are also pointed slightly uphill toward the utensil inlet 26 of the prewash tunnel 22 to also provide a damming effect to assist in floating away foreign material which has been soaked loose or mechanically dislodged by the action of the rotary brushes 106.

The foreign matter which is floated or mechanically dislodged from the utensils 50 lands on the upper portion of the base plate 34 between the side rail members 40 and 42 and flows downwardly until the foreign matter drops out from the utensil prewashing machine 20 through a plurality of suitable apertures 120 in the initial rinsing and soaking region 44, apertures 122 in the brushing region 46, and apertures 124 in the final rinse region 48.

In operation the utensil prewashing machine 20 would be operatively connected adjacent the dishwashing machine, for example, on a work counter 126 adjacent thereto. The food service utensil prewashing machine 20 will be described with regard to the prewashing of compartmented food service trays, although it will be understood that the machine will also efficiently handle other types of food service utensils. As stated previously a source of hot water preferably at about 180° under line pressure is connected to the hot water inlet pipe 70 and a source of cold water under line pressure is connected to the cold water pipe 72. The electrical motor 66 is likewise connected to a suitable source of current. To place the utensil prewashing machine 20 in operating condition, it is merely necessary to turn on the brush motor and open the appropriate water valves.

The regulation of the water valves 74, 76 and 92 is determined by the general characteristic of the foreign material adhering to the food service trays, in other words for dinner meals with gravy, starches, and greasy foods to be removed from the tray surface a temperature of 180° F. would be desirable in the initial rinse and soaking region 44. Accordingly, the by-pass valve 92 would be closed and the hot water inlet valve 74 opened. This would provide a copious amount of hot water at approximately 180° spraying forth from the orifices 87 of the spray arms 86 of the hot water spray header 78. The cold water inlet valve 76 would likewise be open to provide a food particle flotation rinse which sprays forth from the orifices 97 of the cold water spray header 96 which is situated within the rinse and soak region 44. The brushing region is not provided with any spray headers. With the valve set as described a cold water spray would issue forth from the final rinse spray header 94 and its orifices 97 to float away any particles not removed in region 44 which are subsequently dislodged by the brushes 106 and temper or cool the tray 50 to facilitate handling of the tray for purposes of loading it into a dishwasher or the like.

For a breakfast meal when the meal includes or is apt to include such proteinaceous foods such as eggs for example it is preferable to regulate the temperature in the initial rinse and soaking region 44 to approximately 140° F., or below, to prevent "cooking" the proteinaceous matter to the food service trays 50. This is accomplished by opening both the hot water inlet valve 74 and the cold water inlet valve 76 as previously described, and in addition, partially opening the by-pass valve 92 to permit tempering of the hot water with an amount of cold water. A transfer of cold water to the hot water is substantially assured due to the fact that the number of spray orifices 87 in the hot water spray head 78 greatly exceeds the number of spray orifices 97 in the cold water spray header 80, thereby allowing the cold water to seek the path of least resistance. The action of the cold water spray arms 94 and 96 will be the same as previously described.

As seen best by referring to FIGURE 3 there is seen a plurality of compartmented food service trays 50 in various stages of treatment in the utensil prewashing machine 20. The trays 50, which have been divested of extremely bulky foreign material such as cold potatoes, pork chop bones etc., are manually fed into the inlet 26 of the utensil prewashing machine 20 with the food receptive portions facing up. As additional trays are fed in the inlet end the preceding trays are urged into the initial rinse and soak region 44 where they are acted upon by the hot water spray issuing forth from the spray orifices 87. At this point it will be noted that two or more trays remain stationary for a period of time within the initial rinse and soak region 44 which greatly facilitates the soaking and floating away of the foreign material contained on the food service trays 50. As the trays being inserted urge the trays within the soak region 44 toward the spray arms 96 they are subjected to a spray rinse from the spray arm 96 which floats off any particles which have been loosened or emulsified by the soaking spray issuing forth from the hot water spray header 78. The leading edge of the tray 50 is then urged into frictional engagement with the first rotary brush 106 which feeds the tray into engagement under the second rotary brush 106. The resilient frictional retaining means 112 engages the food tray 50 and retains it under the brushes for a length of time sufficient to permit the brushes to thoroughly dislodge any foreign material which may be adhering to the trays 50 after the treatment in the region 44. An additional spray is not necessary in the brushing region 46 because sufficient water remains on the trays from the initial rinse and soaking region 44. As the food service trays 50 are urged out of the brushing region 46 by the combined action of the brushes 106 they are subjected to a final cold water rinse issuing forth from spray arms 94 to float away and rinse off any remaining dislodged particles and reduce the temperature of the tray so that it may be handled manually for placement in a dishwasher, or the like. Although not specifically shown, it will be understood that the brushes 106 are adjustable vertically so that they may be maintained in adequate contact with the surface of the utensils being prewashed.

If extremely greasy utensils are encountered it is merely necessary to leave the cold water inlet valve 76 closed and open the hot water inlet valve 74 as well as the by-pass valve 92 thereby using a hot water spray in both the spray header 78 and the spray header 80.

It may therefore be seen that there has been provided a utensil prewashing machine which is simple in design, compact in nature and highly efficient for the purpose intended.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A food service utensil prewashing machine comprising a prewash tunnel means supported on a horizontally disposed downwardly inclined gravity-feed conveyor adapted to convey the utensils through said prewash tunnel, said conveyor having a relatively high utensil inlet end and a relatively low utensil outlet end, said prewash tunnel including means to soak, dislodge, and rinse away substantially all foreign material adhering to said utensils, said soaking means comprising a first relatively hot water supply connected spray header means adjacent the high inlet end of said conveyor and having a plurality of spray orifices adapted to loosen, emulsify and float away a substantial portion of the foreign material adhering to said utensils before a utensil being operated upon progress along said conveyor into the region of said foreign material dislodging means, said dislodging means comprising power operated brush means located intermediate of the ends of said conveyor and adapted to operatively contact the surface of said utensil to dislodge any tenaciously adhering foreign material, said rinsing means comprising a second relatively cold water supply connected spray header means adjacent the low utensil outlet end and having a plurality of spray orifices adapted to float away the foreign material dislodged by the power operated brush to remove substantially all of the foreign material from said utensils, and a drain means situated in the downwardly inclined conveyor to permit removal of the dislodged foreign material.

2. A food service utensil prewashing machine comprising a prewash tunnel means supported on a horizontally disposed downwardly inclined gravity-feed conveyor adapted to convey the utensils through said prewash tunnel, said prewash tunnel including means to soak, dislodge, and rinse away substantially all foreign material adhering to said utensils, said soaking means comprising a first relatively hot water supply connected spray header means having a plurality of spray orifices adapted to loosen, emulsify and float away the foreign material adhering to said utensils, said dislodging means comprising power operated brush means adapted to operatively contact the surface of said utensil to dislodge any tenaciously adhering foreign material, said rinsing means comprising a second relatively cold water supply connected spray header means having a plurality of spray orifices adapted to float away the foreign material dislodged by the power operated brush to remove substantially all of the foreign material from said utensils, a drain means situated in the downwardly inclined conveyor to permit removal of the dislodged foreign material and a valved by-pass connection between said first relatively hot and said second relatively cold spray header means to permit adjustment of the temperature of the water discharging from said first spray header means.

3. A food service utensil prewashing machine comprising a prewash tunnel means supported on a horizontally disposed downwardly inclined gravity-feed conveyor adapted to convey the utensils through said prewash tunnel, said prewash tunnel including means to soak, dislodge, and rinse away substantially all foreign material adhering to said utensils, said soaking means comprising a first relatively hot water supply connected spray header means having a plurality of spray orifices adapted to loosen, emulsify and float away the foreign material adhering to said utensils, said dislodging means comprising power operated brush means adapted to operatively contact the surface of said utensil to dislodge any tenaciously adhering foreign material, said rinsing means comprising a second relatively cold water supply connected spray header means having a plurality of spray orifices adapted to float away the foreign material dislodged by the power operated brush to remove substantially all of the foreign material from said utensils, a drain means situated in the downwardly inclined conveyor to permit removal of the dislodged foreign material and a horizontally, longitudinally disposed utensil hold-down bar secured within said soaking portion of said tunnel in normally spaced apart relationship above the utensils on said conveyor passing thereunder.

4. A food service utensil prewashing machine comprising a prewash tunnel means supported on a horizontally disposed downwardly inclined gravity-feed conveyor adapted to convey the utensils through said prewash tunnel, said prewash tunnel including means to soak, dislodge, and rinse away substantially all foreign material adhering to said utensils, said soaking means comprising a first relatively hot water supply connected spray header means having a plurality of spray orifices adapted to loosen, emulsify and float away the foreign material adhering to said utensils, said dislodging means comprising power operated brush means adapted to operatively contact the surface of said utensil to dislodge any tenaciously adhering foreign material, said rinsing means comprising a second relatively cold water supply connected spray header means having a plurality of spray orifices adapted to float away the foreign material dislodged by the power operated brush to remove substantially all of the foreign material from said utensils, a drain means situated in the downwardly inclined conveyor to permit removal of the dislodged foreign material, said power operated brush means including a pair of transversely mounted horizontally disposed motor operated rotary brushes operatively contacting the utensils, the rotation of said brushes being such that the utensils are urged along the conveyor toward the discharge end of the tunnel and at least one adjustably secured frictional utensil restraining means to permit adjustment of the length of time that the brushes are in contact with a utensil.

5. A food service prewashing machine comprising a prewash tunnel means supported on the horizontally disposed downwardly inclined gravity-feed conveyor adapted to convey the utensils through said prewash tunnel, said prewash tunnel being an elongated generally rectangular downwardly opening housing operatively supported by said conveyor to permit passage of the utensils along said conveyor and therethrough, said prewash tunnel being longitudinally disposed along said conveyor and having a relatively high utensil inlet and a relatively low prewash utensil outlet, a water spray means operatively connected to a source of hot water, said hot water spray means including a plurality of parallel connected transversely extending horizontally disposed spray arms carried by said prewash tunnel and adapted to spray downwardly on the utensils passing thereunder, a pair of transversely mounted horizontally disposed power operated rotary brushes, the rotation of the brushes being such that they engage a utensil being urged through said spray means to mechanically dislodge foreign material adhering to said utensil while assisting to transport said utensil toward the outlet end of said prewash tunnel, at least one adjustably secured resilient restraining means to regulate the length of time a utensil is subjected to the action of the brushes, a transversely mounted horizontally disposed final spray header, said spray header adapted to rinse away the foreign material dislodged by said brushes, and a plurality of apertures in said conveyor to permit discharge of foreign material dislodged from said utensils during their passage through the prewash tunnel.

6. The structure of claim 5 wherein said hot water spray means extends over a portion of the conveyor positioning at least two of the utensils normally operated on therein to thereby establish a dwell region to effectively emulsify, loosen and float away a substantial portion of the foreign material adhering to the utensils prior to the utensils being subjected to the mechanical brushing.

7. The structure of claim 5 including a valve by-pass connection between said hot spray means and said final spray means to permit adjustment of the temperature of the water discharging from said first spray means.

8. The combination of claim 1 wherein said spray orifices of said hot and cold water supply connected spray header means are positioned so as to direct the spray therefrom upwardly towards said relatively high utensil inlet end of said conveyor whereby water will tend to temporarily collect in a utensil being operated upon so as to assist in floating away the foreign material present on the utensil.

References Cited by the Examiner
UNITED STATES PATENTS

| | | | |
|---|---|---|---|
| 1,179,505 | 4/1916 | Coburn et al. | 134—100 X |
| 2,651,065 | 9/1953 | O'Connor | 15—56 |

CHARLES A. WILLMUTH, *Primary Examiner.*

E. L. ROBERTS, *Assistant Examiner.*